United States Patent Office 3,124,619
Patented Mar. 10, 1964

3,124,619
BENZYL ETHER THIOETHERS
Walter Reifschneider, Midland, Mich., assignor to The Dow Chemical Company, Midland, Mich., a corporation of Delaware
No Drawing. Filed June 27, 1962, Ser. No. 205,527
6 Claims. (Cl. 260—609)

The present invention is directed to thioethers and in particular is directed to novel thioethers corresponding to the formula

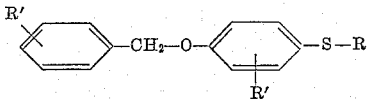

In the present specification and claims, R represents a member of the group consisting of hydrocarbon aryl and hydrocarbon alkaryl of 6 to 10, inclusive, carbon atoms, an alkyl group containing from 1 to 12, inclusive, carbon atoms, cycloalkyl, and R' represents hydrogen or an alkyl group of from 1 to 4, inclusive, carbon atoms.

The novel compounds are colorless crystalline solids, usually platelets, appearing white in mass, very slightly soluble in water but readily soluble in various common organic solvents such as xylene, benzene and the like. They are useful as insecticides and herbicides, various of them are excellent veterinary internal parasiticides for use with warm-blooded animals. They are useful as piscicides and in the control of aquatic weeds. The compounds are useful as rodent repellents, as de-naturants for industrial ethanol and as additives to lubricating oils. They are useful as intermediates in the preparation of dyestuffs and biologically active phosphate materials.

The compounds are prepared by a process which comprises the step of causing a reaction between an ether halide compound of the formula

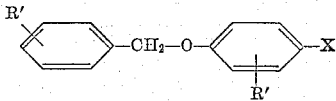

wherein X represents halogen, and a mercaptan compound corresponding to the formula

wherein G represents cuprous copper, hydrogen, or alkali metal. The present reaction consumes the reactants in equimolecular amounts. Small amounts of mercaptan may be lost in side reactions. Thus, when it is desired to prepare the present compound in a high state of purity and with a minimum of necessary post-synthesis purification procedure, the starting reactants should usually be employed in equimolecular proportions, or preferably, with the mercaptan in slight excess. However, other proportions may be employed if desired, and unconsumed starting material of whatever identity may, if desired, be recycled into further synthesis process.

The reaction goes forward at temperatures over a wide range, such as from 20° to 350° C., but initiates most readily when heated to a temperature somewhat higher than room temperature. A preferred temperature range is from about 80° to about 230° C. Under these conditions the reaction is, in general, exothermic and goes forward to completion with good yield calculated upon the basis of consumed starting material. When employing mercaptan, hydrogen halide of reaction is evolved and means for its orderly disposal are advantageously provided.

Typically in the preparation of the compounds of the present invention, reaction between the mercaptan starting material and the ether halide starting material will initiate and go forward only when there is employed, a catalytic amount of both a source of cuprous ion and a nitrogenous base. In the preparation of many, and probably all of the present compounds, the employment of such catalyst is essential and critical, although the exact weight is not critical. Certainly the employment of such catalyst is in all cases highly advantageous. The source of cuprous ion may be metallic copper, in which case the copper reacts in some way to obtain cuprous halide. Also, cuprous oxide may be employed as a source of cuprous ion in which case water of reaction is evolved and cuprous halide results. Cuprous chloride itself or other cuprous salt may be employed. The employed weight is not critical, but may vary from a very small trace amount, less than 1/100 of 1 molar percent, to as much as an amount equimolecular with either reactant or even greater. In general, the employment of larger amounts is accompanied by no major advantage and, being expensive, is not preferred.

The nitrogenous base can be ammonia, a primary, secondary, or tertiary aliphatic or aromatic amine or a nitrogenous heterocycle wherein the nitrogen acts, or is capable of acting, as a basic substance. If desired, the nitrogenous base may be a naturally liquid substance which is employed as a reaction medium. Otherwise, such base is dissolved in inert liquid reaction medium, such as an aliphatic or aromatic hydrocarbon oil.

It is preferred, in at least laboratory preparations, to employ the nitrogenous base catalyst substance in sufficient excess that portions of it may also act as hydrogen halide acceptor and yet further portions may continue to function, unreacted, in the necessary catalytic manner.

In carrying out the reaction to prepare the compounds of the present invention, the ether halide and the mercaptan are intimately mixed and blended, in any order and in desired amounts, with source of cuprous ion and nitrogenous base as hereinbefore described, and thereafter heated, at a temperature at which reaction takes place promptly. In one convenient method of practicing the present method, the reaction temperature may be the reflux temperature of the liquid reaction medium. In this situation, heating may be continued at the boiling temperature of the reaction mixture and under reflux for a period of time to carry the reaction to completion.

Upon completion of the reaction, the desired compounds of the present invention are separated in manners which, in view of the teaching of the instant specification, will be evident to skilled chemists. In one such manner, the reaction mixture, hot from heating at the reaction temperature, is poured into a mixture of ice and concentrated hydrochloric acid whereupon a precipitate forms from which the desired product can be extracted as a solvent-soluble fraction. Representative extraction solvents include diethyl ether, chlorinated hydrocarbons, and benzene. The said precipitate is extracted with solvent, the solvent extract dried over an inert drying agent such as, for example, anhydrous potassium carbonate or the like; the solvent vaporized and removed and the remaining product induced to crystallize and, if desired, recrystallized from a solvent such as a lower alkanol: or if, desired, vacuum distilled.

When production of the present compound is to be carried out on an industrial scale, various other methods of separation and purification may be preferred, including, for example, centrifugation, decantation, vacuum distillation, and the like.

The following examples, without more, will enable those skilled in the art to practice the present invention.

EXAMPLE I

*Benzyl p-(Methylthio)Phenyl Ether*

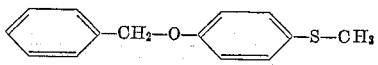

A reaction mixture was prepared consisting essentially of 131.6 grams of benzyl p-bromophenyl ether, 45 grams of sodium salt of methyl mercaptan, 7 grams of cuprous bromide and 250 milliliters of technical 2,4-lutidine. The resulting mixture was placed in a flask under reflux. In this situation, the reaction mixture was heated at its reflux temperature (a pot temperature between approximately 155° and 170° C.) for 22 hours to carry the reaction to completion. At the end of this reaction period, the resulting hot mixture was poured into an excess of hydrochloric acid dispersed in an abundance of flaked ice. As a result of these procedures, the ice melted and basic substances reacted with hydrochloric acid; in the resulting acidified water there formed a precipitate comprising product. The precipitate was collected by filtration and the resulting solid was extracted with ether, the ether extract liquid being saved.

This liquid was dried over a bed of anhydrous potassium carbonate. The resulting liquid was warmed to vaporize and remove ether solvent to obtain 105 grams of a crystalline solid. This crystalline solid was taken up in, and recrystallized from ethanol, to obtain a benzyl p-(methylthio)phenyl ether product in the form of small white crystalline platelets. The product had a molecular weight of 230.3 and melted at 78°–79.5° C. It was ascertained that, when present in the diet of a warm-blooded animal (mice) heavily infested with roundworms, in the amount of 300 parts of the present compound per million parts by weight of diet, there resulted a 100 percent control of the said roundworms, without evident injury to the warm-blooded animal. Also, when applied as a herbicide in the form of a water spray at the rate of 100 parts of the present compound per million parts by weight of aqueous dispersion, the compound killed a substantial fraction of a stand of pigweed plants.

In an essentially similar preparation, except that the employed mercaptide is the sodium salt of benzenethiol, there is prepared benzyl(p-phenylthio)phenyl ether, also crystallizing as white plates. The compound has insecticidal and herbicidal properties.

EXAMPLE II

*Benzyl 4-(Ethylthio)-m-Tolyl Ether*

A reaction mixture is prepared, consisting of 27.7 grams (0.1 mole) of benzyl 4-bromo-3-methylphenyl ether, 10 grams of cuprous bromide (technical grade) and 9.25 grams (approximately 0.11 mole) of sodium ethyl mercaptide dispersed in a mixture consisting of 110 milliliters quinoline and 20 milliliters pyridine. The resulting reaction mixture is placed in a flask equipped with a reflux condenser, stirrer, and heating means. In this situation, the reaction mixture is heated at its reflux temperature (a pot temperature between approximately 150° and 200° C.) for 6 hours to carry the reaction to completion. At the end of this reaction period, the resulting hot mixture is poured into a mixture of shaved ice and excess concentrated hydrochloric acid. As a result of these procedures, the ice melts and basic substances react with hydrochloric acid; in the resulting acidified water a precipitate forms. The precipitate is collected by filtration and extracted with ether, the ether extract liquid being saved. This liquid is dried over a bed of anhydrous potassium sulfate; the resulting liquid is warmed to vaporize and remove ether solvent and obtain a residual oil. This oil crystallizes upon standing; the crystals are taken up in hot ethanol and precipitated therefrom as the ethanol cools, to obtain benzyl 4-(ethylthio)-m-tolyl ether as a white crystalline solid melting at 25°–26° C. The product is found to be more than 95 percent pure.

The compound of the present example is useful as an insecticide for the control of economic insects. The application of a water dispersion containing 500 parts of the said compound as sole toxicant per million parts of resulting aqueous dispersion to a population of adult *Conotrachelus nenuphar* (Herbst) results in the kill of a substantial proportion of the insects. Also, the use as a thorough wetting spray of an aqueous preparation containing, as sole active agent, the compound of the present example in the proportion of 4,000 parts per million parts by weight of resulting aqueous dispersion resulted in a complete kill of all the tomato plants of a group of young, healthy such plants to which the spray was applied.

In the synthesis resulting from the reaction of the potassium salt of benzenethiol with benzyl 4-chloro-3-methylphenyl ether, there is obtained benzyl 4-(phenyl-thio)-m-tolyl ether, as a white, crystalline solid.

Also, when employing benzyl 4-bromo-3-methyl-phenyl ether and the sodium salt of normal butyl mercaptan there is prepared a yellow product oil comprising 90 percent benzyl 4-(butylthio)-m-tolyl ether. The product boils at 163° C. under pressure of 0.3 millimeter mercury. The desired compound is further separated by redistillation at subatmospheric pressure.

Very low concentrations of this compound dispersed in water are quite effective for the destruction of fish, as is often done preparatory to restocking a body of water. For example, in the control of *Notropis a. atherinoides*, the medium lethal dosage upon 24 hours exposure is about one part of the present compound per million parts by weight of water. In contrast, ingestion of the present compound at the rate of 100 milligrams per kilogram body weight by a group of white mice caused no visible effect in the mice, all of which survived in apparently excellent health.

EXAMPLE III

In procedures essentially similar to the foregoing, except that the starting mercaptan is p-tert-butylbenzenethiol (boiling at 120° C. under 20 millimeters mercury pressure) and is reacted with p-tert-butylbenzyl-4-chloro-3-n-butylphenyl ether, there is prepared, in good yield, p-tert-butylbenzyl-4-(p-tert-butylphenylthio)-3-n-butylphenyl ether, as white crystalline plates, soluble in 95 percent ethanol and in benzene, and of extremely low solubility in water.

When the employed mercaptan compound is α-naphthalenethiol, and as hydrogen halide acceptor sodium hydroxide is added to the reaction mixture, there is prepared a p-tertiary-butylbenzyl-4-(1-naphthylthio)-3-n-butylphenyl ether, as white crystals.

When the employed mercaptan is cyclohexyl mercaptan, there is prepared a p-tert-butylbenzyl-4-cyclohexylthio-3-n-butylphenyl ether.

The mercaptans, benzenethiols and naphthalenethiols, necessary as starting materials in the practice of the present invention are, for the most part, articles of commerce. However, those which are not can readily be prepared in known procedures such as, for example, the method of Pieverling. See Liebig's Annalen der Chemie, volume 183, pages 344–359, note especially page 349 and following. Other methods are well known to those skilled in the art. The alkali metal salts of these substances are readily prepared by reaction with an alkali metal hydroxide or the alkali metal itself, in known procedures. Preparation of benzyl-4-bromo-3-methylphenyl ether is described in the Journal of The American Chemical Society, volume 55, page 146 and following, by Huston, Neeley, Fayerweather, D'Arcy, Maxfield, Ballard and Lewis.

I claim:

1. A compound corresponding to the formula

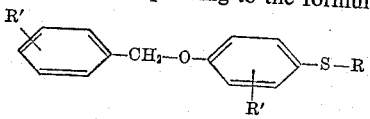

wherein R represents a member of the group consisting of hydrocarbon aryl and hydrocarbon alkaryl of 6 to 10, inclusive, carbon atoms, alkyl containing from 1 to 4, inclusive, carbon atoms, and cycloheptyl, and R' represents a member of the group consisting of hydrogen and lower alkyl.

2. Benzyl 4-(ethylthio)-m-tolyl ether.
3. Benzyl 4-(phenylthio)-m-tolyl ether.
4. Benzyl 4-(butylthio)-m-tolyl ether.
5. p - Tert - butylbenzyl-4-(1-naphthylthio)-3-n-butylphenyl ether.
6. Benzyl p-(methylthio)phenyl ether.

No references cited.

UNITED STATES PATENT OFFICE
CERTIFICATE OF CORRECTION

Patent No. 3,124,619                              March 10, 1964

Walter Reifschneider

It is hereby certified that error appears in the above numbered patent requiring correction and that the said Letters Patent should read as corrected below.

Column 6, line 4, for "cyclohepyl" read -- cyclohexyl --.

Signed and sealed this 11th day of August 1964.

(SEAL)
Attest:

ERNEST W. SWIDER                            EDWARD J. BRENNER
Attesting Officer                                Commissioner of Patents